United States Patent
Stamey, Jr. et al.

(10) Patent No.: US 11,623,168 B2
(45) Date of Patent: Apr. 11, 2023

(54) FILTER ELEMENT

(71) Applicant: MANN+HUMMEL Filtration Technology US LLC, Gastonia, NC (US)

(72) Inventors: Willie L. Stamey, Jr., Kings Mountain, NC (US); Mark A. Roll, Bessemer City, NC (US)

(73) Assignee: MANN+HUMMEL Filtration Technology US LLC, Gastonia, NC (US)

( * ) Notice: Subject to any disclaimer, the term of this patent is extended or adjusted under 35 U.S.C. 154(b) by 0 days.

(21) Appl. No.: 16/442,222

(22) Filed: Jun. 14, 2019

(65) Prior Publication Data
US 2020/0391140 A1    Dec. 17, 2020

(51) Int. Cl.
*B01D 29/15*    (2006.01)

(52) U.S. Cl.
CPC .......... *B01D 29/15* (2013.01); *B01D 2201/16* (2013.01); *B01D 2201/291* (2013.01); *B01D 2201/304* (2013.01); *B01D 2201/316* (2013.01)

(58) Field of Classification Search
CPC .............. B01D 29/15; B01D 2201/291; B01D 2201/316; B01D 2201/347
USPC ................................................. 210/234, 235
See application file for complete search history.

(56) References Cited

U.S. PATENT DOCUMENTS

| | | | |
|---|---|---|---|
| 2002/0036165 A1* | 3/2002 | Sommer ............ | B01D 46/2414 210/438 |
| 2006/0054547 A1* | 3/2006 | Richmond ........... | B01D 35/153 210/234 |
| 2007/0241047 A1* | 10/2007 | Roll ...................... | B01D 35/153 210/437 |
| 2008/0217237 A1 | 9/2008 | Deedrich et al. | |
| 2011/0017657 A1 | 1/2011 | Jokschas et al. | |
| 2012/0168359 A1* | 7/2012 | Marshall .............. | B01D 35/153 210/136 |
| 2013/0327696 A1 | 12/2013 | Bagci et al. | |
| 2016/0184750 A1 | 6/2016 | Eberle et al. | |

(Continued)

FOREIGN PATENT DOCUMENTS

JP        2015-205256 A      11/2015

OTHER PUBLICATIONS

International Search Report and Written Opinion dated Nov. 2, 2020, relating to International Application No. PCT/US2020/037470.

*Primary Examiner* — Benjamin M Kurtz
(74) *Attorney, Agent, or Firm* — Honigman LLP (57) ABSTRACT

A filter assembly includes a ring of filter media, a first end cap, a second end cap, a first seal, and a second seal. The first end cap is coupled to a first end of the filter media. The second end cap is coupled to a second end of the filter media and includes (i) a radially extending portion having a first opening and (ii) a first axially extending portion having a stepped ledge defining a first inner diameter. The first seal is supported by the second end cap and includes a second opening defining a second inner diameter that is less than the first inner diameter. The second seal is supported by the second end cap and includes a third opening defining a third inner diameter that is greater than the first and second inner diameters. The stepped ledge is disposed between the first seal and the second seal.

19 Claims, 5 Drawing Sheets

(56) References Cited

U.S. PATENT DOCUMENTS

2017/0106317 A1\* 4/2017 Stamey, Jr. ............ B01D 29/58
2021/0170314 A1\* 6/2021 Chavan ................ B01D 35/153

\* cited by examiner

FILTER ELEMENT

TECHNICAL FIELD

This disclosure relates generally to a filter element, and more particularly to a filter element including a standpipe activation feature.

BACKGROUND

This section provides background information related to the present disclosure and is not necessarily prior art.

Various filter elements are known in the art for filtering a fluid, such as oil or fuel, for example, as it passes through a flow path and into an underlying system, such as an engine system. Such filter elements include a filter media that removes impurities from the fluid as it passes through the filter media.

In most applications, either the filter element or the filter media associated therewith must be periodically removed from a housing or larger assembly and replaced to prevent the development of unacceptably high restrictions in the fluid flow path. When replacing a filter element or filter media it is often desirable to ensure that fluid cannot flow into or through the underlying system until the filter has been completely reassembled into the housing or larger assembly. For example, known filter elements often include a plurality of keys that engage a plurality of keyways on a filter standpipe in order to activate the filter standpipe and allow the fluid to flow into or through the underlying system upon reassembling the filter element to the housing. While known filter elements have proven to be acceptable for their intended purposes, a continuous need for improvement remains in the pertinent art.

SUMMARY

This section provides a general summary of the disclosure, and is not a comprehensive disclosure of its full scope or all of its features.

One aspect of the disclosure provides a filter assembly including a ring of filter media, a first end cap, a second end cap, a first seal, and a second seal. The ring of filter media defines a first end and a second end opposite the first end. The first end cap is coupled to the first end, and the second end cap is coupled to the second end. The second end cap includes a radially extending portion and a first axially extending portion. The radially extending portion has a first opening, and the first axially extending portion has a stepped ledge defining a first inner diameter. The first seal is supported by the second end cap. The first seal includes a second opening defining a second inner diameter less than the first inner diameter. The second seal is supported by the second end cap and includes a third opening defining a third inner diameter greater than the first inner diameter and the second inner diameter. The stepped ledge is disposed between the first seal and the second seal.

Implementations of this aspect of the disclosure may include one or more of the following features. In some examples, the second seal is made of a flexible polymer material.

In some implementations, the third inner diameter is configured to expand with engagement of a standpipe.

In some implementations, the stepped ledge may include a step surface that is substantially perpendicular to an inner surface of the first axially extending portion.

In some implementations, the second seal is at least partially disposed within the first opening.

In some implementations, the second seal includes a first radially extending surface and a second radially extending surface opposite the first radially extending surface. The first radially extending surface may be parallel to the second radially extending surface. The first radially extending surface may also face away from the stepped ledge. In some examples, the first radially extending surface defines the third inner diameter. The third inner diameter may be configured to expand upon flexing the second radially extending surface.

In some implementations, the second end cap includes a second axially extending portion extending opposite the first axially extending portion. The second axially extending portion may be substantially perpendicular to the radially extending portion.

Another aspect of the disclosure provides a filter assembly including a ring of filter media, a first end cap, and a second end cap. The ring of filter media defines a first end and a second end opposite the first end. The first end cap is coupled to the first end. The second end cap is coupled to the second end. The second end cap includes a first seal and a stepped ledge. The first seal includes a radially extending seal surface and an axially extending seal surface. The radially extending seal surface is configured to engage a radially extending surface of a valve member defining a first outer diameter. The axially extending seal surface is configured to engage an axially extending surface of a lock member defining a second outer diameter less than the first outer diameter. The stepped ledge is configured to engage the radially extending surface of the valve member.

Implementations of this aspect of the disclosure may include one or more of the following features. In some implementations, the first seal is made of a flexible polymer material.

In some implementations, the second end cap includes an axially extending portion. The axially extending portion may further include a step surface that is substantially perpendicular to an inner surface of the axially extending portion.

In some examples, the first seal is at least partially disposed in a first opening of the second end cap.

In some examples, the radially extending seal surface includes a first radially extending surface and a second radially extending surface opposite the first radially extending surface. The first radially extending surface may also be parallel to the second radially extending surface. The first radially extending surface may define the first outer diameter. The first outer diameter may be configured to expand upon flexing of the second radially extending surface.

In some implementations, the second end cap includes a first axially extending portion and a second axially extending portion. The second axially extending portion may extend opposite the first axially extending portion. The second axially extending portion may also be substantially perpendicular to the radially extending seal surface.

The details of one or more implementations of the disclosure are set forth in the accompanying drawings and the description below. Other aspects, features, and advantages will be apparent from the description and drawings, and from the claims. The description and specific examples in this summary are intended for purposes of illustration only and are not intended to limit the scope of the present disclosure.

DESCRIPTION OF DRAWINGS

The drawings described herein are for illustrative purposes only of selected configurations and not all possible implementations, and are not intended to limit the scope of the present disclosure.

Like reference symbols in the various drawings indicate like elements.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Referring to FIGS. 1A-4, an exemplary filter assembly 100 is shown. As will be explained in more detail below, during operation, the filter assembly 100 may be coupled to, or assembled with, a standpipe valve assembly 101 to allow a fluid (e.g., oil, fuel, etc.) to flow through the standpipe valve assembly 101 and into an underlying system (e.g., an engine system).

Figure 2:
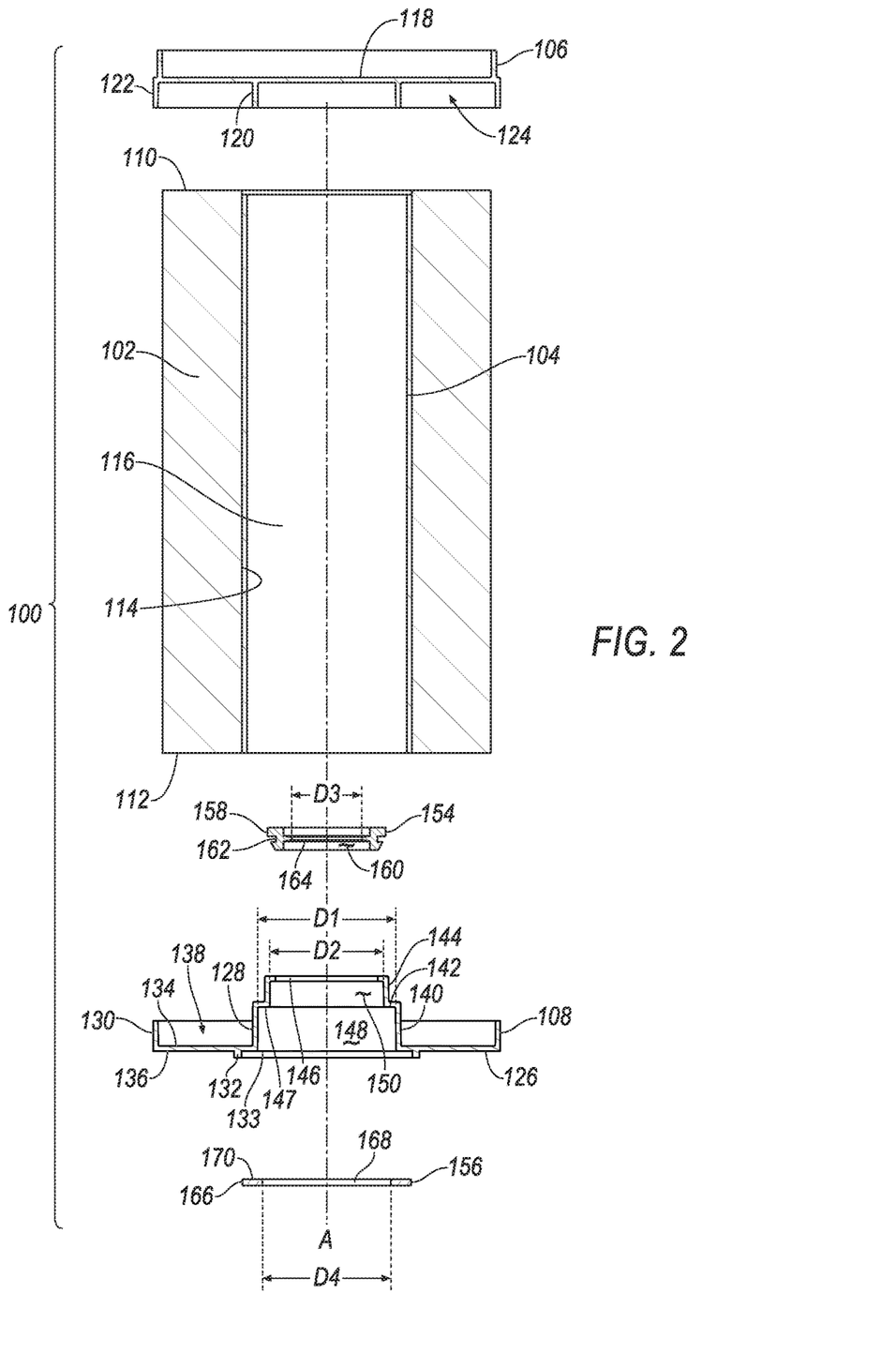
FIG. 2 is a cross-sectional exploded view of the filter element of FIG. 1A.

The filter assembly 100 may include a ring of filter media 102, a central tube 104, a first end cap 106, and a second end cap 108. The ring of filter media 102 may include a corrugated or pleated construct disposed about, and extending along, a longitudinal axis A-A and having a first end 110 and a second end 112 opposite the first end 110. As illustrated in FIG. 2, in some implementations, the ring of filter media 102 defines a hollow cylindrical shape, including an inner surface 114 surrounding an inner chamber 116. The central tube 104 may be disposed within the inner chamber 116. For example, the central tube 104 may define a hollow cylindrical shape extending along the inner surface 114 and the longitudinal axis A-A from the first end 110 of the filter media 102 to the second end 112 of the filter media 102.

Figure 1A:
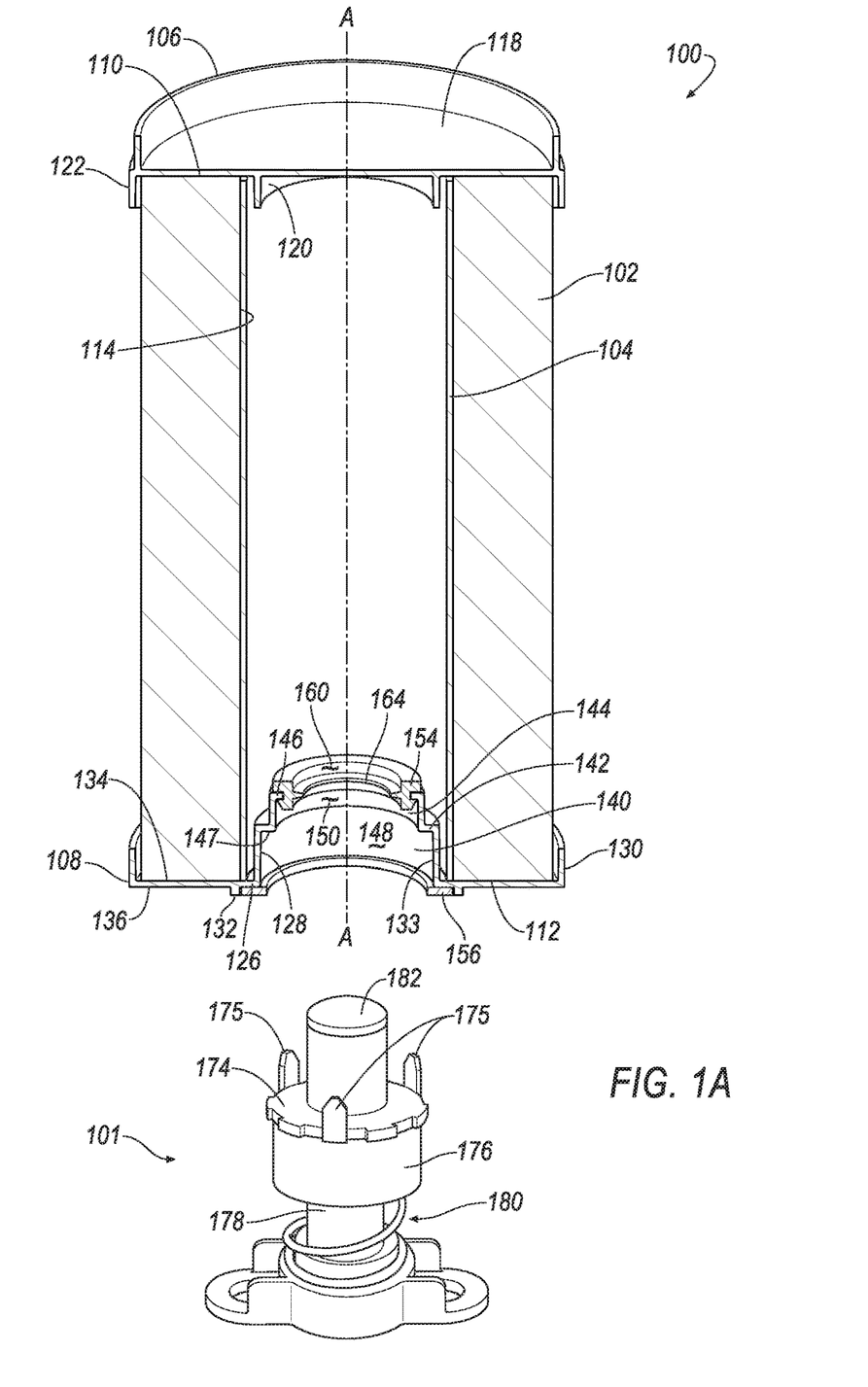
FIG. 1A is a cross-sectional view of a filter element prior to being assembled with a standpipe in accordance with the principles of the present disclosure.
Figure 1B:
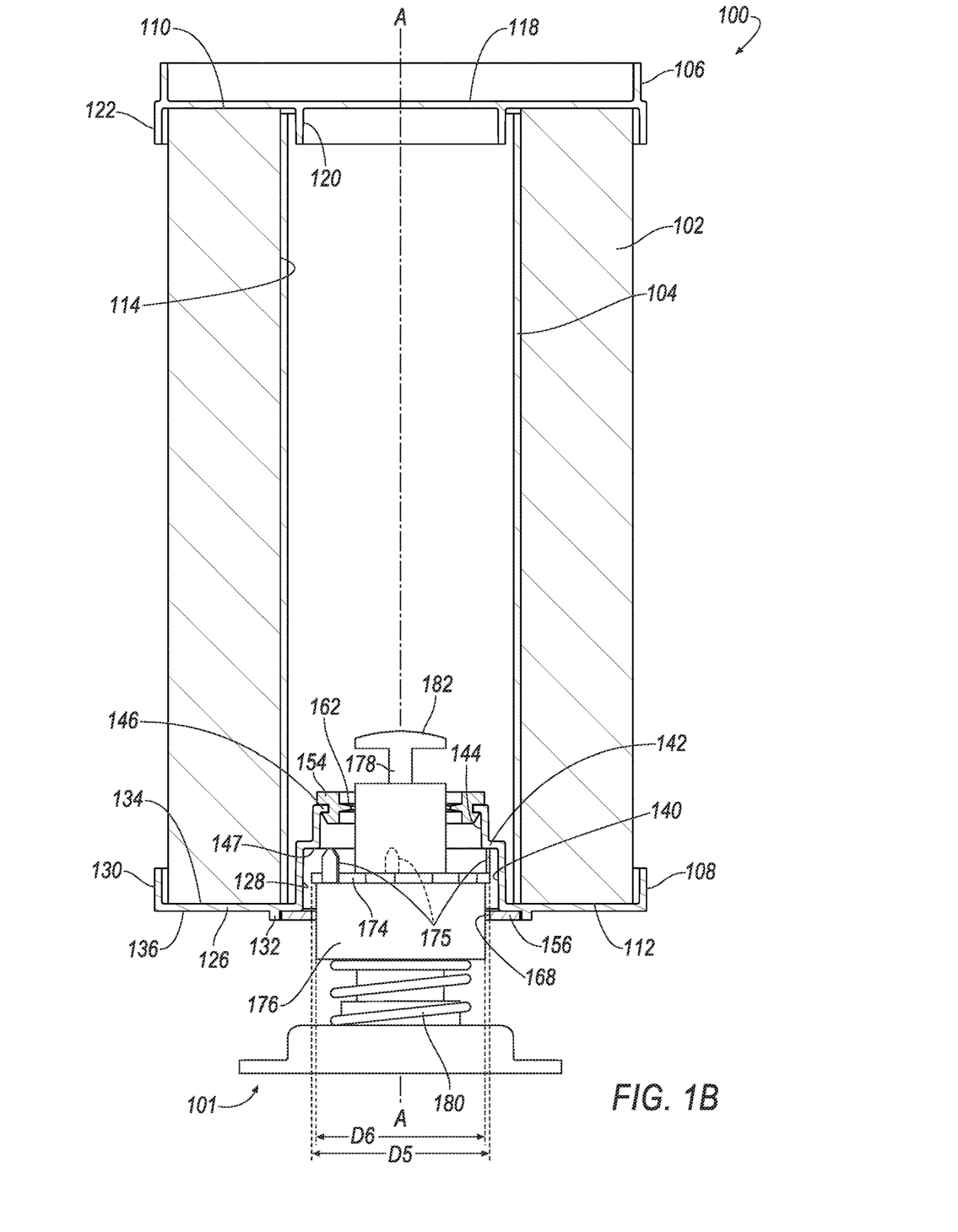
FIG. 1B is a cross-sectional view of the filter element of FIG. 1A after being assembled with the standpipe in accordance with the principles of the present disclosure.

With reference to FIGS. 1A and 1B, the first end cap 106 may include a radially-extending plate portion 118, an axially-extending inner portion or wall 120 and an axially-extending outer portion or wall 122. The outer wall 122 may surround the inner wall 120 such that the inner and outer walls 120, 122 define an annular channel 124 (FIG. 2) therebetween. As illustrated in FIGS. 1A and 1B, in an assembled configuration, the first end cap 106 may be disposed on the first end 110 of the filter media 102 such that the axis A-A intersects the plate portion 118. In particular, the filter media 102 may be disposed within the annular channel 124 such that the inner wall 120 is disposed within the inner chamber 116 of the filter media 102 and the outer wall 122 surrounds the filter media 102. In some implementations, the first end cap 106 (e.g., the plate portion 118, the inner wall 120, or the outer wall 122) supports and engages the ring of filter media 102 in a fluid tight relation via any desired manner including, for example, an adhesive compound.

The second end cap 108 may include a radially-extending portion 126, an axially-extending inner portion or wall 128, an axially-extending outer portion or wall 130, and an axially-extending portion or flange 132. The radially-extending portion 126 may extend in a direction transverse (e.g., perpendicular) to the axis A-A and define a first opening 133. As illustrated in FIGS. 1A and 1B, the inner and outer walls 128, 130 may extend in a first direction from the radially-extending portion 126, while the axially-extending flange 132 may extend in a second direction, opposite the first direction, from the radially-extending portion 126. For example, the inner and outer walls 128, 130 may extend in the first direction from a first side 134 of the radially-extending portion 126, while the axially-extending flange 132 may extend in the second direction from a second side 136 of the radially-extending portion 126. As illustrated, the first side 134 may be opposite the second side 136, such that the inner and outer walls 128, 130 and the axially-extending flange 132 are each disposed about, or surround, the axis A-A. The outer wall 130 may further surround the inner wall 128 such that the inner and outer walls 128, 130 define an annular channel 138 (FIG. 2) therebetween.

As illustrated in FIG. 2, the inner wall 128 may further include a proximal portion 140, a shoulder or stepped ledge 142, a distal portion 144, and a lip 146. The proximal portion 140 may extend from the radially-extending portion 126 in the first direction and include a proximal inner surface 148 defining a first radially-extending dimension (e.g., diameter) D1. The stepped ledge 142 may include a step surface 147 extending from the proximal portion 140 in a direction transverse to the first direction. For example, the step surface 147 may extend radially-inward from the proximal portion 140 to the distal portion 144. The distal portion 144 may extend from the stepped ledge 142 in the first direction and include a distal inner surface 150 defining a second radially-extending dimension (e.g., diameter) D2 that is less than the first dimension D1. As illustrated, the stepped ledge 142 may extend between proximal portion 140 and the distal portion 144 and between the first and second dimensions D1, D2. In an example, the stepped ledge 142 is substantially perpendicular to the inner surfaces 148, 150. The lip 146 may extend from the distal portion 144 in a direction transverse to the first direction. For example, the lip 146 may extend radially-inward from the distal portion 144.

The filter assembly 100 may further include a first molded seal 154 and a second flat seal 156. The first seal 154 and second seal 156 may be made of a flexible polymer material. In some examples, the first seal 154 and the second seal 156 are made of a rubber material. In other examples, the first seal 154 and the second seal 156 are made of a flexible plastic material.

The first seal 154 may include an outer axially-extending surface 158 and an inner axially-extending surface 160. The outer surface 158 may define an annular channel 162. The inner axially-extending surface 160 may include a radially-extending flange 164 having an inner dimension (e.g., diameter) D3 that is less than the second dimension D2. In this regard, the inner axially-extending surface 160 and the radially-extending flange 164 may define an opening extending through the first seal 154.

With further reference to FIG. 2, the second seal 156 may include an outer axially-extending surface 166, an inner axially-extending surface 168, and a radially-extending surface 170. The inner surface 168 may define a fourth inner dimension (e.g., diameter) D4 that is less than the first dimension D1 and greater than the second and third dimensions D2, D3. In this regard, the inner surface 168 may define an opening extending through the second seal 156.

In the assembled configuration, the second end cap 108 may support the first seal 154 and the second seal 156. For example, the lip 146 of the inner wall 128 may be disposed within the channel 162 of the first seal 154 to secure the first seal 154 to the second end cap 108, while surface 166 or the radially-extending surface 170 of the second seal 156 may be secured to the second side 136 or to the axially-extending flange 132 of the radially-extending portion 126 to secure the second seal 156 to the second end cap 108.

Figure 3:
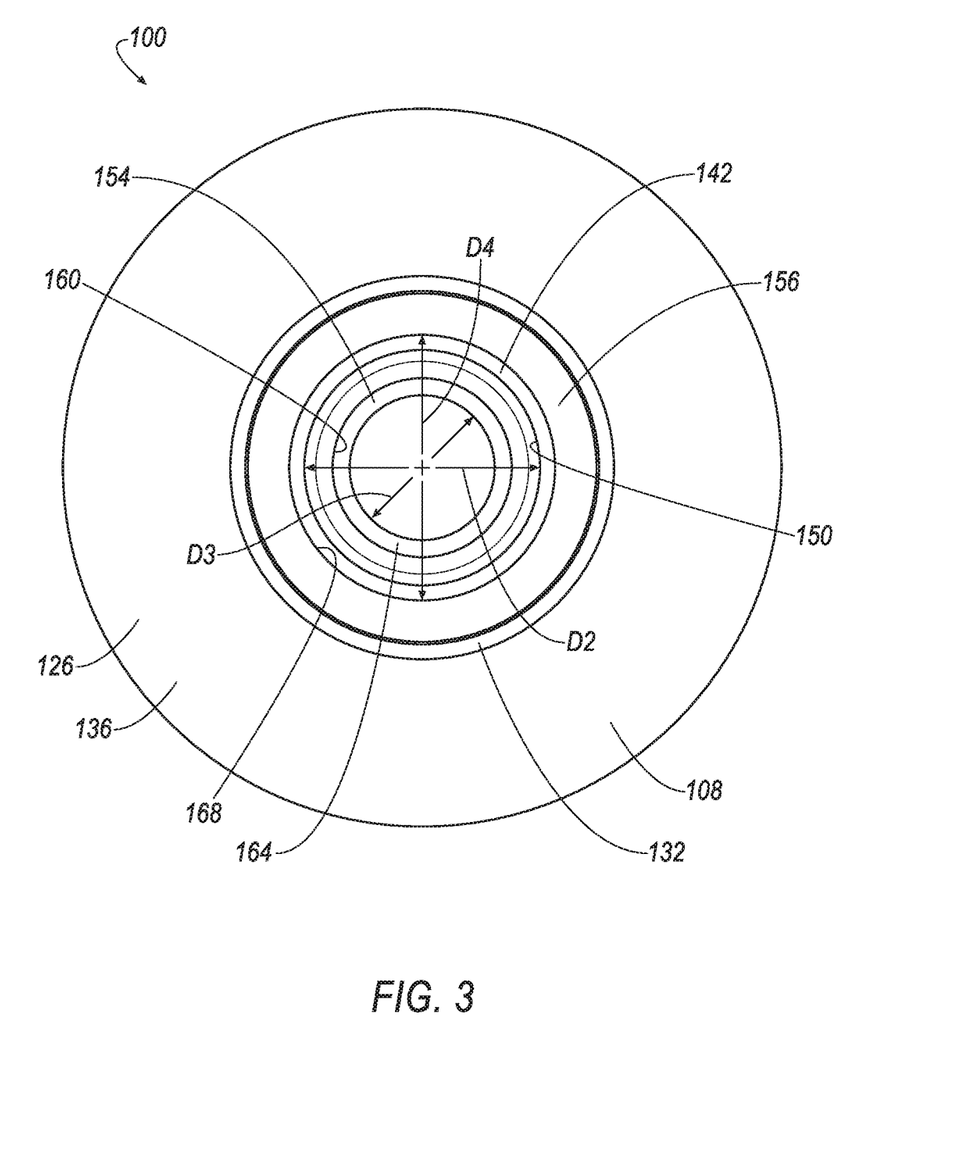
FIG. 3 is a top view of the filter element of FIG. 1A.
Figure 4:
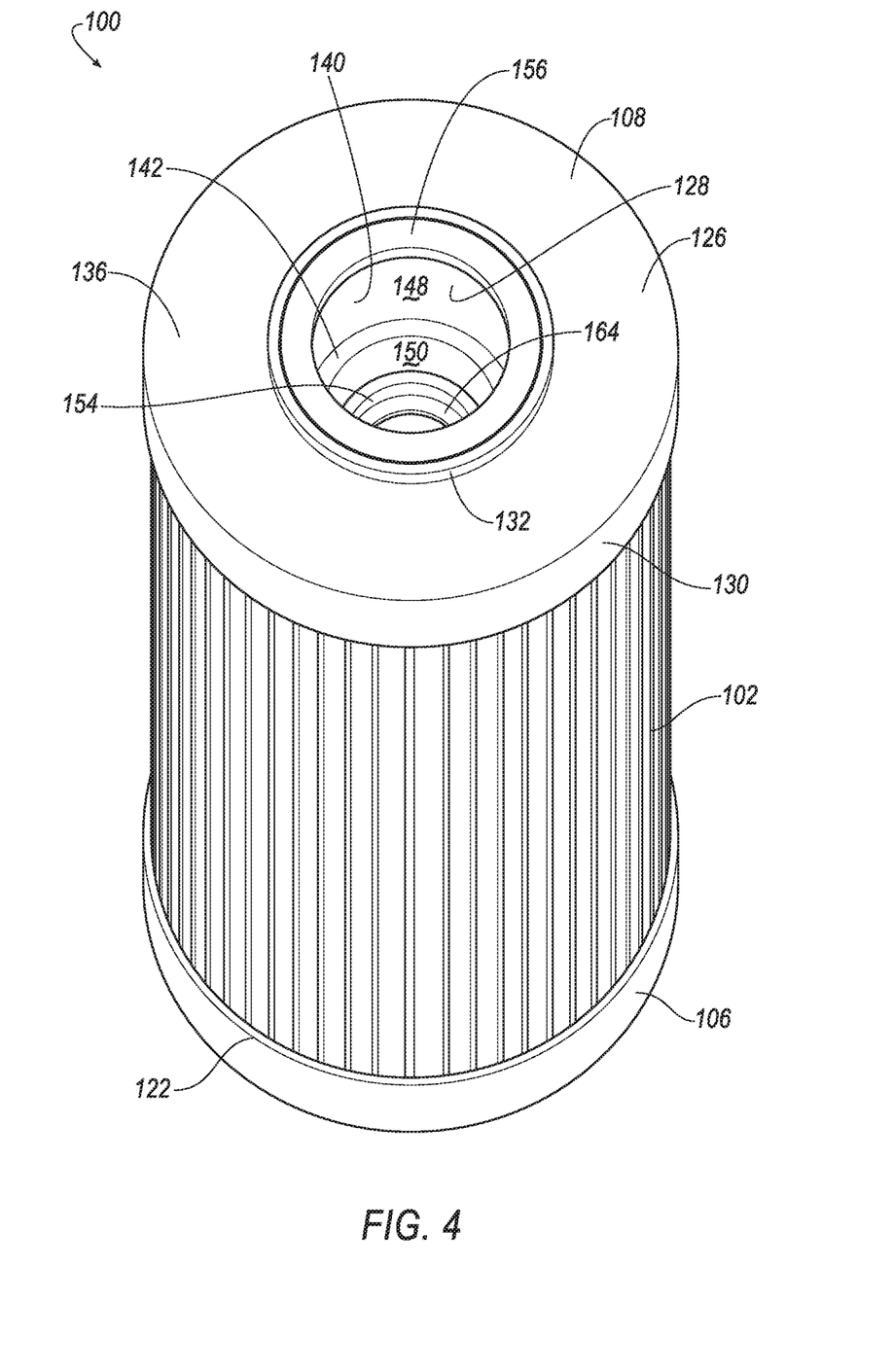
FIG. 4 is a perspective view of the filter element of FIG. 1A.

With reference to FIG. 3, the radially-extending portion 126 of the second end cap 108 may have a dimension or diameter greater than the second seal 156. The fourth inner dimension D4 of the inner axially-extending surface 168 of the second seal 156 may be greater than the second dimension D2 of the distal inner surface 150 of the stepped ledge 142. The second dimension D2 may be greater than the third dimension D3 of the radially-extending flange 164.

As illustrated in FIGS. 1A-2, the standpipe valve assembly 101 may include a valve member (e.g., upper piece 174), a lock member (e.g., lower piece 176), a stem 178, and a biasing member 180. The upper piece 174 may define a first maximum outer dimension D5 that is greater than the second dimension D2 and the fourth dimension D4, and less than the first dimension D1. The upper piece 174 may also include a plurality of pins 175 extending along the A-A axis. The lower piece 176 may define a second maximum outer dimension D6 that is less than the first maximum outer dimension D5 and greater than the fourth dimension D4 of the second seal 156.

The upper and lower pieces 174, 176 may be translatably coupled to the stem 178. For example, relative to FIG. 1B, the upper and lower pieces 174, 176 may be coupled to the stem 178 for translation along the stem 178 in a direction substantially parallel to the axis A-A. During operation, translation of the lower piece 176 away from the upper piece 174 along the axis A-A may allow the upper piece 174 to translate towards the lower piece 176 along the axis A-A. In this regard, the lower piece 176 may prevent the upper piece 174 from translating toward the lower piece 176 along the axis A-A prior to translation of the lower piece 176 away from the upper piece 174 along the axis A-A. Upon translation of the lower piece 176 away from the upper piece 174 along the axis A-A, and subsequent translation of the upper piece 174 toward the lower piece 176 along the axis A-A, fluid may flow between the stem 178 and the upper or lower pieces 174, 176. Conversely, prior to translation of the lower piece 176 away from the upper piece 174, the biasing member 180 may apply a force on the upper and lower pieces 174, 176 to cause a plug 182 of the stem 178 to engage the upper piece 174 and prevent fluid from flowing between the stem 178 and the upper piece 174 or the lower piece 176.

With reference to FIGS. 1A-2, during operation, the filter assembly 100 may engage the standpipe valve assembly 101. Referring to FIG. 1B, the exemplary filter assembly 100 is shown in engagement with the standpipe valve assembly 101. In an example, the fourth inner dimension D4 of the second seal 156 permits the standpipe valve assembly 101 to pass through the second seal 156, and the third inner dimension D3 of the first seal 154 permits the standpipe valve assembly 101 to pass through the first seal 154. In particular, the inner dimension D4 permits the upper piece 174, including the first maximum outer dimension D5, to pass through the second seal 156 until the inner surface 168 engages the lower piece 176.

After the second seal 156 engages the lower piece 176, further translation of the filter assembly 100 along the axis A-A (e.g., translation of the first end cap 106 toward the standpipe valve assembly 101) causes the second seal 156 to apply a force on the lower piece 176 to move the lower piece away from the upper piece 174 until the stepped ledge 142 (e.g., step surface 147) engages the upper piece 174. In one example, the stepped surface 147 engages the upper piece 174 at the plurality of pins 175.

After the stepped ledge 142 engages the upper piece 174, further translation of the filter assembly 100 along the axis A-A (e.g., translation of the first end cap 106 toward the standpipe valve assembly 101) causes the stepped ledge 142 to apply a force on the upper piece 174 to move the upper piece 174 toward the lower piece 176 and allow fluid to flow between the stem 178 and the upper piece 174 or the lower piece, as previously described. Engagement of the first seal 154 (e.g., the flange 164) with the upper piece 174 may prevent fluid from flowing between first seal 154 and the upper piece 174 and through the first opening 133 of the second end cap 108.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A filter system comprising
a standpipe including (i) a valve member defining a first outer diameter and (ii) a lock member defining a second outer diameter that is less than the first outer diameter, the lock member operable to translate away from the valve member along an axis; and,
a filter assembly including:
a ring of filter media defining, an inner surface, a first end, and a second end opposite the first end;
a central tube disposed within the ring of filter media and engaging the inner surface;
a first end cap coupled to the first end;
a second end cap coupled to the second end, the second end cap including a radially extending portion, a first axially extending portion disposed within the central tube and defining a first inner diameter that is greater than the first outer diameter of the valve member, a second axially extending portion disposed within the central tube and defining a second inner diameter that is less than the first outer diameter of the valve member, and a lip disposed within the central tube, the radially extending portion having an outermost surface opposing the second end of the filter media and defining a first opening, the first axially extending portion having an annular stepped ledge extending radially-inwardly from the first inner diameter of the first axially extending portion to the second inner diameter of the second axially extending portion, the lip extending radially-inward from the second axially extending portion;
a first seal defining an annular channel configured to receive the lip, the first seal including a second opening defining a third inner diameter less than the second inner diameter; and
a second seal engaging the outermost surface of the second end cap and including an inner surface formed of a flexible material defining a third opening having a fourth inner diameter that is (i) less than the first inner diameter, (ii) greater than the second inner diameter and the third inner diameter and (iii) less than the first outer diameter and the second outer diameter, wherein the annular stepped ledge is disposed between the first seal and the second seal and the inner surface of the second seal is configured to engage an outer surface of the lock member of the standpipe to move the lock member away from the valve member.

2. The filter system of claim 1, wherein the second seal is made of a flexible polymer material.

3. The filter system of claim 1, wherein the fourth inner diameter is configured to expand with engagement of a standpipe.

4. The filter system of claim 1, wherein the annular stepped ledge includes a step surface that is substantially perpendicular to an inner surface of the first axially extending portion.

5. The filter system of claim 1, wherein the second seal is at least partially disposed within the first opening.

6. The filter system of claim 1, wherein the second seal includes a first radially extending surface and a second radially extending surface opposite the first radially extending surface.

7. The filter system of claim 6, wherein the first radially extending surface is parallel to the second radially extending surface.

8. The filter system of claim 6, wherein the first radially extending surface faces away from the annular stepped ledge.

9. The filter system of claim 8, wherein the first radially extending surface defines the fourth inner diameter, and wherein the fourth inner diameter is configured to expand upon flexing the second radially extending surface.

10. The filter system of claim 1, wherein the second axially extending portion extends opposite the first axially extending portion and substantially perpendicular to the radially extending portion.

11. The filter system of claim 1, wherein the first axially extending portion extends from the radially extending portion to the annular stepped ledge.

12. A filter system comprising:
a standpipe including (i) a valve member defining a first outer diameter and (ii) a lock member defining a second outer diameter that is less than the first outer diameter, the lock member operable to translate away from the valve member along an axis; and
a filter assembly including:
a ring of filter media defining an inner surface, a first end, and a second end opposite the first end;
a central tube disposed within the ring of filter media and engaging the inner surface;
a first end cap coupled to the first end; and
a second end cap coupled to the second end, the second end cap including a first seal, a radially-inward extending lip disposed within the central tube, a second seal, an annular stepped ledge disposed within the central tube, and an outermost surface opposing the second end of the filter media, the first seal including a radially extending seal surface and an axially extending seal surface, the radially extending seal surface including a first portion engaging the outermost surface of the second end cap and a second portion configured to engage a radially extending surface of the valve member defining the first outer diameter, the axially extending seal surface having a first inner diameter less than the first outer diameter and the second outer diameter and configured to engage an axially extending surface of the lock member defining the second outer diameter to move the lock member away from the valve member, wherein the annular stepped ledge is configured to engage the radially extending surface of the valve member, and wherein the second seal defines an annular channel configured to receive the lip.

13. The filter system of claim 12, wherein the first seal is made of a flexible polymer material.

14. The filter system of claim 12, wherein the second end cap includes an axially extending portion, the axially extending portion including a step surface that is substantially perpendicular to an inner surface of the axially extending portion.

15. The filter system of claim 12, wherein the first seal is at least partially disposed in a first opening of the second end cap.

16. The filter system of claim 12, wherein the radially extending seal surface includes a first radially extending surface and a second radially extending surface opposite the first radially extending surface.

17. The filter system of claim 16, wherein the first radially extending surface is parallel to the second radially extending surface.

18. The filter system of claim 12, wherein the second end cap includes a first axially extending portion and a second axially extending portion, the second axially extending portion extending opposite the first axially extending portion and substantially perpendicular to the radially extending seal surface.

19. The filter system of claim 12, wherein the outermost surface of the second end cap defines an opening, and wherein the second end cap includes an axially extending surface extending from the outermost surface to the annular stepped ledge.

* * * * *